(No Model.) 2 Sheets—Sheet 1.

A. C. BRANTINGHAM.
DUST COLLECTOR.

No. 527,936. Patented Oct. 23, 1894.

WITNESSES:
F. W. Warner
J. A. Walsh

INVENTOR
Allen C. Brantingham,
BY
Chester Bradford,
ATTORNEY.

(No Model.) 2 Sheets—Sheet 2.
A. C. BRANTINGHAM.
DUST COLLECTOR.
No. 527,936. Patented Oct. 23, 1894.
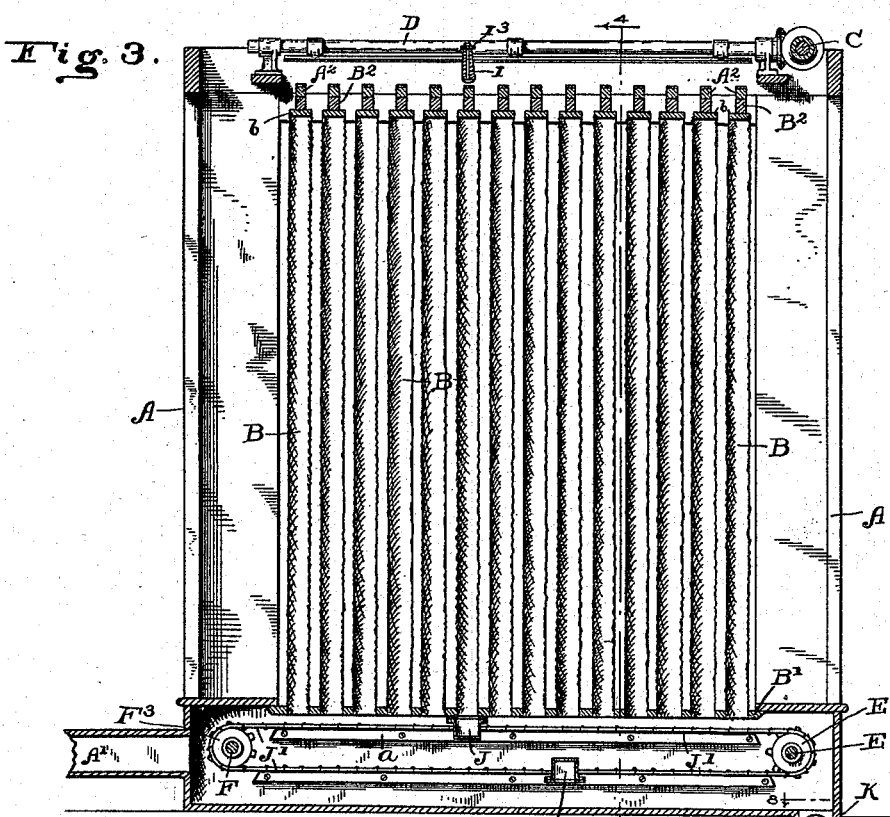
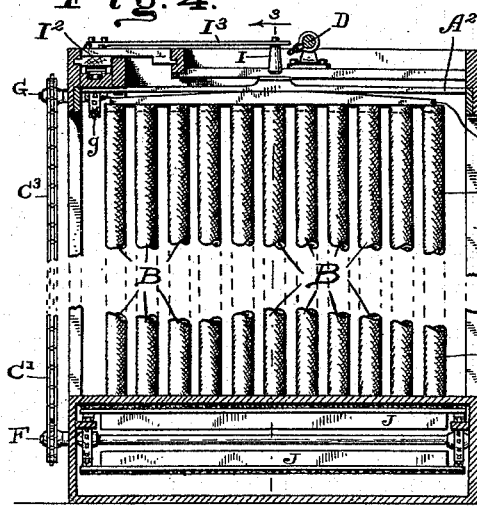
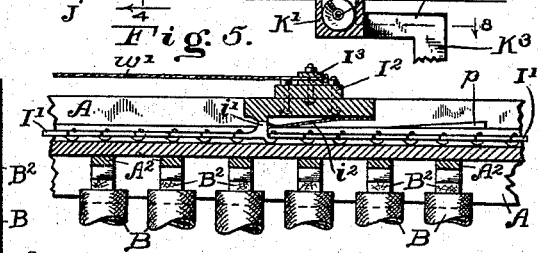
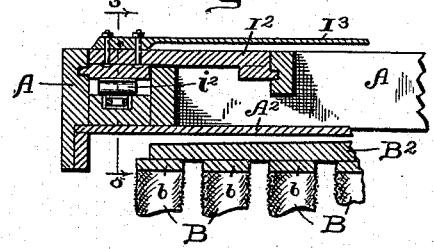
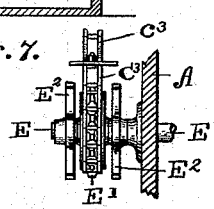
WITNESSES:
F. W. Warner.
J. A. Walsh.
INVENTOR
Allen C. Brantingham,
BY Chester Bradford
ATTORNEY.

United States Patent Office.

ALLEN C. BRANTINGHAM, OF TOLEDO, OHIO, ASSIGNOR TO THE NORDYKE & MARMON COMPANY, OF INDIANAPOLIS, INDIANA.

DUST-COLLECTOR.

SPECIFICATION forming part of Letters Patent No. 527,936, dated October 23, 1894.

Application filed February 12, 1894. Serial No. 499,905. (No model.)

*To all whom it may concern:*

Be it known that I, ALLEN C. BRANTINGHAM, a citizen of the United States, residing at Toledo, in the county of Lucas and State of Ohio, have invented certain new and useful Improvements in Dust-Collectors, of which the following is a specification.

The object of my said invention is to produce a dust collector which may be made any desired size or capacity; and it is similar in many respects to that shown and described in my application, Serial No. 490,875, filed November 14, 1893,—the present machine embodying a construction whereby the tubes are permitted to remain stationary.

Figure 1:
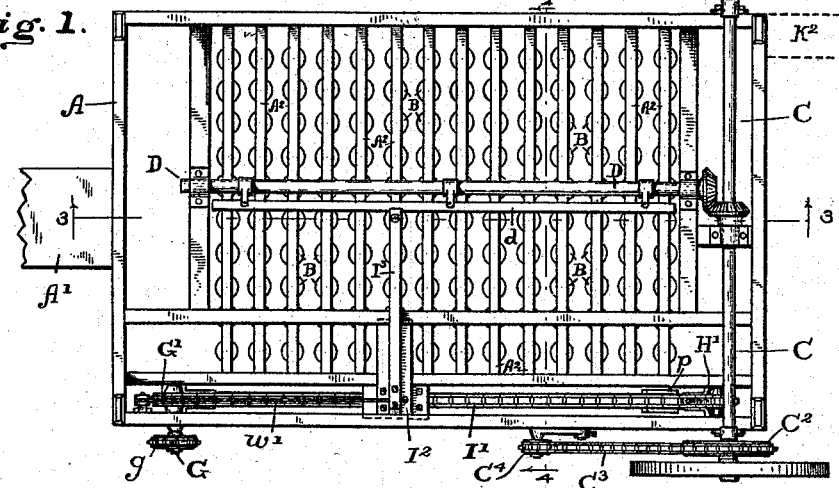
Figure 2:
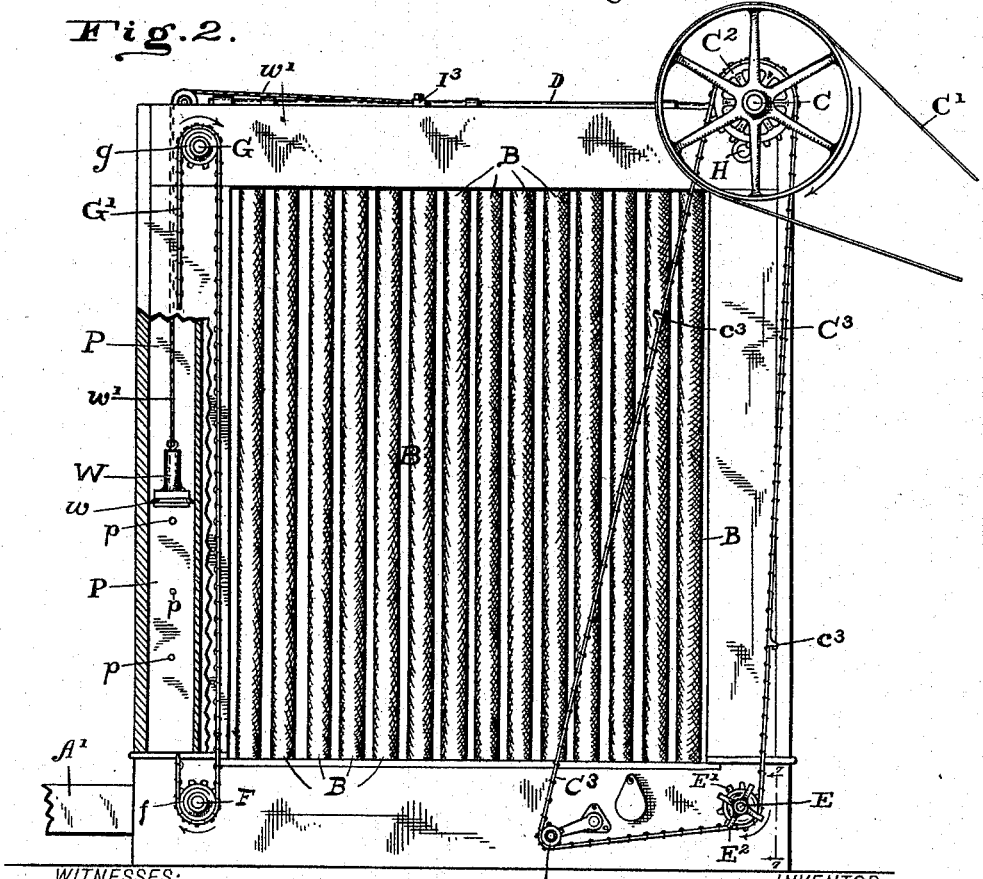
Figure 8:
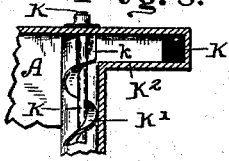

Referring to the accompanying drawings, which are made a part hereof, and on which similar letters of reference indicate similar parts, Figure 1 is a top or plan view of a machine embodying my present invention; Fig. 2, a side elevation of the same; Fig. 3, a longitudinal vertical section on the dotted lines 3 3 in Figs. 1 and 4; Fig. 4, a transverse vertical section on the dotted lines 4 4 in Figs. 1 and 3, the central portion being broken away; Fig. 5, a detail view on the dotted line 5 5 in Fig. 6, on an enlarged scale; Fig. 6, a fragmentary view similar to a portion of Fig. 4, on an enlarged scale; Fig. 7, a detail view as seen from the dotted line 7 7 in Fig. 2, on an enlarged scale, and Fig. 8, a detail view on the dotted line 8 8 in Fig. 3.

In said drawings the portions marked A represent the frame-work; B, the dust collecting tubes; C, the driving shaft; D, the hammer-operating shaft; E F G and H, shafts carrying chain belts driving the dust receptacles, and the hammer, respectively; I, the hammer; J, the dust receptacles, and K, a conveyer.

The frame-work A is of any appropriate or desired construction, and of a size sufficient to accommodate the number of tubes required for the work to be performed. The bottom of this frame-work is in the form of a closed chamber into which the blast of dust laden air is conveyed at any suitable point, or from any desired direction by an air tube, as A'. Within this chamber are the shafts E F and the dust receptacles, and in a suitable way is a conveyer, as will be presently described.

The dust tubes B are like those shown in my application above referred to, and are of a suitable fabric, through which the air under pressure may escape, while the dust is retained within said tubes. As these tubes are stationary in this machine, any number of them required may be employed, by simply extending the frame-work, and lengthening the chains carrying the hammer and dust receptacles. At the bottom these tubes are secured to the head B', which is stationary, and through which the open ends of the tubes extend into the chamber in the bottom of the frame-work A. At the upper ends each row of tubes is secured to a cross-bar $B^2$, and this is suspended to a flexible bar $A^2$ secured to the sides of the frame A.

To the under side of the bars $B^2$ are secured the heads $b$ of the tubes, said heads being preferably small round blocks which extend down into the upper ends of the tubes, as shown in Fig. 3, where the tubes are shown in section.

The main shaft C is shown as driven by a belt C' from any suitable source of power. (Not shown.) Upon this shaft is a sprocket wheel $C^2$, which drives a chain belt $C^3$, which passes over the idlers E' and $C^4$ back to the wheel $C^2$. This chain belt is provided with projections $c^3$, and there are spiders $E^2$ on the shaft E, with the arms of which said projections will come in contact as the chain travels. The wheel E' being an idler wheel loose on the shaft E, while the spiders $E^2$ are fixedly mounted thereon, the shaft E is only revolved when the projections $c^3$ come in contact with the arms of the spiders. Each movement so produced is sufficient to shift one of the dust receptacles from one row of tubes to another, as will be presently described. Upon the shaft E, upon the inside of the chamber, are other sprocket wheels $E^3$, and there are similar sprocket wheels $F^3$ upon the shaft F, and over these sprocket wheels run chain belts J', which chain belts carry the dust receptacles J.

The shaft D is driven from the shaft C, as shown most plainly in Fig. 1, and is provided with a wing $d$ extending substantially the entire length thereof, which wing is adapted to engage with the projecting end of the spring hammer-handle $I^3$, and thus raise said hammer each time the shaft revolves, while the spring-handle of the hammer causes it, when said handle escapes from said wing, to descend forcibly upon the spring-bar $A^2$, above which it is at the time, jarring said bar and all the tubes B which are connected thereto. As will be observed by an examination of the drawings, particularly Fig. 3, the hammer is above that row of tubes below which the dust receptacle J at the time is. The mechanism is so proportioned that the shaft D will revolve several times (preferably three times), and thus the row of tubes receive several jars from the hammer before it is moved on to the next row. This is secured by means of the projection $c^3$ and the arms of the spiders $E^2$, as elsewhere explained; such arrangement permitting the shafts E F G and H to remain stationary for certain periods, and to have an intermitting movement.

The shaft G at the other end of the machine is driven by a chain belt $G'$ running on sprocket wheels $f$ and $g$ secured respectively on the shaft F, and on said shaft G. Inside the frame-work A on said shaft G and on the shaft H are placed wheels $G'$ and $H'$ over which the chain belt $I'$ passes, which is connected to the hammer carriage $I^2$. By means of these connections, as described, a uniform movement of the hammer and the dust receptacles is secured.

The hammer I is mounted on a spring arm $I^3$ which is attached to the hammer carriage $I^2$, and said hammer-carriage, as shown most plainly in Fig. 6, travels in ways in longitudinal bars of the frame A. It is, of course, necessary that the hammer after having traveled over all the tubes should return and begin its work over again; and so I have provided a detachable connection between said chain $I'$ and the hammer-carriage $I^2$ and a trip at the end of its course.

As shown in Fig. 5, a spring-catch $i^2$ is secured to the under side of the hammer-carriage $I^2$, which engages with a projection $i'$ on the chain $I'$, and thus said hammer carriage, with the hammer, is carried forward by said chain as it progresses. At the end of its course, however, is an inclined trip $p$ on each side of the chain, with which the spring-catch $i^2$ (which is of considerable width) will come in contact when it reaches that point, and be pressed upwardly until it escapes from the projection $i'$ on the chain.

A weight W and cord $w'$ connected to the hammer-carriage, as indicated in Fig. 2, will, immediately after the engagement between the catch $i^2$ and the projection $i'$ is released, draw the hammer-carriage and hammer back to the point of starting, where a second projection on the chain is ready to engage with the catch and drive it forward as before. The hammer during its travel, has repeatedly struck, as has heretofore been explained. This method of returning the hammer, were the weight permitted to travel freely, would cause too violent a shock upon the hammer-carriage, and so I have provided a dash-pot for the weight, which consists of an inclosing tube P built into the frame-work, as shown in Fig. 2; and I secure around the weight a flexible ring or packing $w$, which comes lightly in contact with the sides of the dash-pot, thus practically preventing the passage of air up by the weight. In order, however, to permit the weight to descend and perform its work, I make small perforations $p$ in the side of the dash-pot at intervals, the lower end of the dash-pot, however, being entirely closed, and thus forming a complete air cushion when the weight reaches its lowest position. The rapidity with which the weight would otherwise return is thus considerably lessened during its whole movement, while the shock is almost completely taken up by the air cushion at the termination of such movement.

The dust receptacles J are long narrow boxes resting upon strips $a$ in the air-tight chamber below the tubes, and are adapted to cover the lower ends of one row after another of said tubes, as the work of the machine progresses, and receive the dust therefrom. As they cover the mouths of said tubes, of course no air can enter such tubes while these receptacles are being used in connection therewith, and when the hammer at the top or the partial collapsing of the tubes dislodges the dust it is free to fall into said receptacle.

Instead of having the receptacle run back, as the hammer does, two of them are provided, as shown in Fig. 3. When one of the receptacles has traveled throughout the length of the machine, receiving its quota of dust from each row of tubes, in passing the shaft E it is inverted, and discharges its load into the conveyer K, by which it is conveyed out of the machine. Said conveyer K throughout the greater part of its length, is of any ordinary or desired construction. It is mounted in the conveyer trough $K'$, which is secured at one end of the machine under the floor of the air chamber, and extends entirely across said machine. At one end this trough is provided with a discharging tube $K^2$ which extends out substantially horizontally for a short distance, and there preferably connects with the top of a vertical tube $K^3$. The conveyer directly opposite the mouth of the tube $K^2$ is provided with a flat wing $k$, instead of having a spiral wing extending to the end. This wing serves to pack the dust into the tube $K^2$ tightly, so that no air is enabled to pass therethrough, and this makes in connection with this machine an automatic valve or air lock for preventing the escape of air, while permitting the escape of the dust. In order to facilitate the discharge of the dust, the vertical tube $K^3$ should be of larger diameter than the horizontal tube $K^2$, as shown, and thus the packed dust will break off and fall down said vertical tube as it reaches the end of said horizontal tube, without being obstructed by coming in contact with the far side of said vertical tube.

Having thus fully described my said invention, what I claim as new, and desire to secure by Letters Patent, is—

1. The combination, with dust collecting tubes, of an intermittingly moving traveling dust receptacle arranged below said tubes, and an intermittingly moving traveling hammer arranged above said tubes, and mechanism connecting the receptacle and the hammer, whereby they are moved simultaneously and caused to operate upon the same tube or the same set of tubes, and upon one tube or upon one set of tubes after another.

2. The combination, in a dust collector, of a suitable frame-work, dust collecting tubes mounted therein, an intermittingly moving traveling dust receptacle under the lower ends of said tubes, and an intermittingly traveling hammer above the upper ends of said tubes, means for moving said dust receptacle and said hammer uniformly from one tube or set of tubes to another tube or set or tubes, and means for operating said hammer to jar the tubes, substantially as set forth.

3. The combination, in a dust collector, of the frame-work, the dust collecting tubes, the main shaft C, the belt $C^3$ driven thereby having one or more projections $c^3$, the shaft E having an idler to carry the belt, and a spider or spiders alongside said idler wherewith the projections on said belt engage, other shafts F G and H, chain belts connecting the same, certain of said chain belts carrying dust receptacles and a hammer, a spring-handle for the hammer, and a cam or winged shaft for operating said hammer, substantially as set forth.

4. The combination, in a dust collector, with the frame-work and dust collecting tubes, of a traveling hammer, a chain belt for driving the same having a projection, a spring catch on the hammer-carriage engaging with said projection, an inclined trip at the end of the travel for disengaging said catch from said projection, and a cord and weight attached to the hammer carriage to return it to the initial point when said disengagement is effected, substantially as set forth.

5. The combination, in a dust collector, with spring-carried dust-collecting tubes, of a hammer, a hammer-carriage for said hammer mounted in traveling ways over said dust collecting tubes, means for returning said hammer and hammer-carriage to the initial point after the end of its travel is reached, and a winged shaft for operating said hammer throughout its trip, whereby it is enabled to operate successively upon each set of tubes, substantially as set forth.

6. The combination, in a dust collector, with the tubes and a traveling hammer for jarring said tubes, of a traveling catch for driving the hammer-carriage, a pawl for disengaging said catch at the end of the route, and a weight attached to the hammer-carriage by a rope for returning the same to position, substantially as set forth.

7. The combination, in a dust collector, with a set of tubes and a traveling hammer for jarring the sets of tubes successively, of a weight connected by a rope to said hammer for returning the same to position, and a dash-pot in which said weight is situated, whereby the rapidity of its movement is retarded and an air cushion provided to receive the shock of its stopping, substantially as set forth.

8. The combination, in a dust collector, of a frame-work, the stationary dust collecting tubes mounted therein, an intermittingly moving hammer arranged to travel over said tubes and operate successively upon each, an intermittingly moving dust receptacle adapted to move successively from tube to tube and receive the dust therefrom, and means for operating the same.

9. The combination, in a dust collector, of a chamber into which the dust-laden air is driven, dust collecting apparatus connected with said chamber, receiving and depositing devices in said chamber, a conveyer trough at one end of said chamber in which the dust is deposited, a conveyer therein, a practically horizontal discharging tube, and a wing on said conveyer adapted to force and pack the dust into said discharging tube, whereby the escape of air is prevented, while the escape of dust is permitted, substantially as set forth.

In witness whereof I have hereunto set my hand and seal, at Toledo, Ohio, this 3d day of February, A. D. 1894.

ALLEN C. BRANTINGHAM. [L. S.]

Witnesses:
D. W. MARMON,
ROBT. WHITTLEESY.